(12) United States Patent
Rochel et al.

(10) Patent No.: US 11,829,364 B2
(45) Date of Patent: Nov. 28, 2023

(54) MAKING DECISIONS FOR PLACING DATA IN A MULTI-TENANT CACHE

(71) Applicant: Amazon Technologies, Inc., Seattle, WA (US)

(72) Inventors: Steffen Rochel, Burlingame, CA (US); Tim Januschowski, Berlin (DE); Sainath Chowdary Mallidi, Seattle, WA (US); Andrew Edward Caldwell, Santa Clara, CA (US); Islam Mohamed Hatem A Atta, Redmond, WA (US); Valentin Flunkert, Berlin (DE); Arjun Ashok, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 17/364,808

(22) Filed: Jun. 30, 2021

(65) Prior Publication Data
US 2023/0004564 A1  Jan. 5, 2023

(51) Int. Cl.
*G06F 16/00* (2019.01)
*G06F 16/2455* (2019.01)
*G06F 16/28* (2019.01)
*G06F 16/2453* (2019.01)

(52) U.S. Cl.
CPC .. *G06F 16/24552* (2019.01); *G06F 16/24539* (2019.01); *G06F 16/24568* (2019.01); *G06F 16/283* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 7,130,967 B2 | 10/2006 | Arimilli et al. | |
| 9,176,878 B2 | 11/2015 | Ono et al. | |
| 9,444,752 B2 | 9/2016 | Backholm | |
| 10,482,062 B1 * | 11/2019 | Muniswamy Reddy | G06F 3/061 |
| 2019/0243570 A1 | 8/2019 | Mittal | |
| 2019/0243771 A1 | 8/2019 | Mittal | |
| 2020/0081867 A1 | 3/2020 | Muniswamy Reddy | |
| 2021/0117868 A1 * | 4/2021 | Sriharsha | G06F 16/23 |
| 2021/0342677 A1 * | 11/2021 | Dalli | G06N 3/0427 |
| 2022/0342952 A1 * | 10/2022 | Panikkar | G06N 20/00 |

FOREIGN PATENT DOCUMENTS

| | | |
|---|---|---|
| WO | 2020186081 A1 | 9/2020 |
| WO | 2020231642 A1 | 11/2020 |

OTHER PUBLICATIONS

Richa Verma, et al., "A Generalized Reinforcement Learning Algorithm for Online 3D Bin-Packing", arXiv:2007.00463v1, Jul. 1, 2020, pp. 1-9.
International Search Report and Written Opinion dated Nov. 22, 2022 in PCT/US2022/073185, Amazon Technologies, Inc.

* cited by examiner

*Primary Examiner* — Anhtai V Tran
(74) *Attorney, Agent, or Firm* — S. Scott Foster; Kowert, Hood, Munyon, Rankin & Goetzel P.C.

(57) ABSTRACT

Placement decisions may be made to place data in a multi-tenant cache. Usage of multi-tenant cache nodes for performing access requests may be obtained. Usage prediction techniques may be applied to the usage to determine placement decisions for data amongst the multi-tenant cache nodes. Placement actions for the data amongst at the multi-tenant cache nodes may be performed according to the placement decisions.

20 Claims, 10 Drawing Sheets

US 11,829,364 B2

MAKING DECISIONS FOR PLACING DATA IN A MULTI-TENANT CACHE

BACKGROUND

As the technological capacity for organizations to create, track, and retain information continues to grow, a variety of different technologies for accessing data with increasing speed and efficiency continue to be developed. Computational storage, for example may be utilized by various applications to perform some of the data processing work prior to returning requested data to the application, such as database system.

Figure 1:
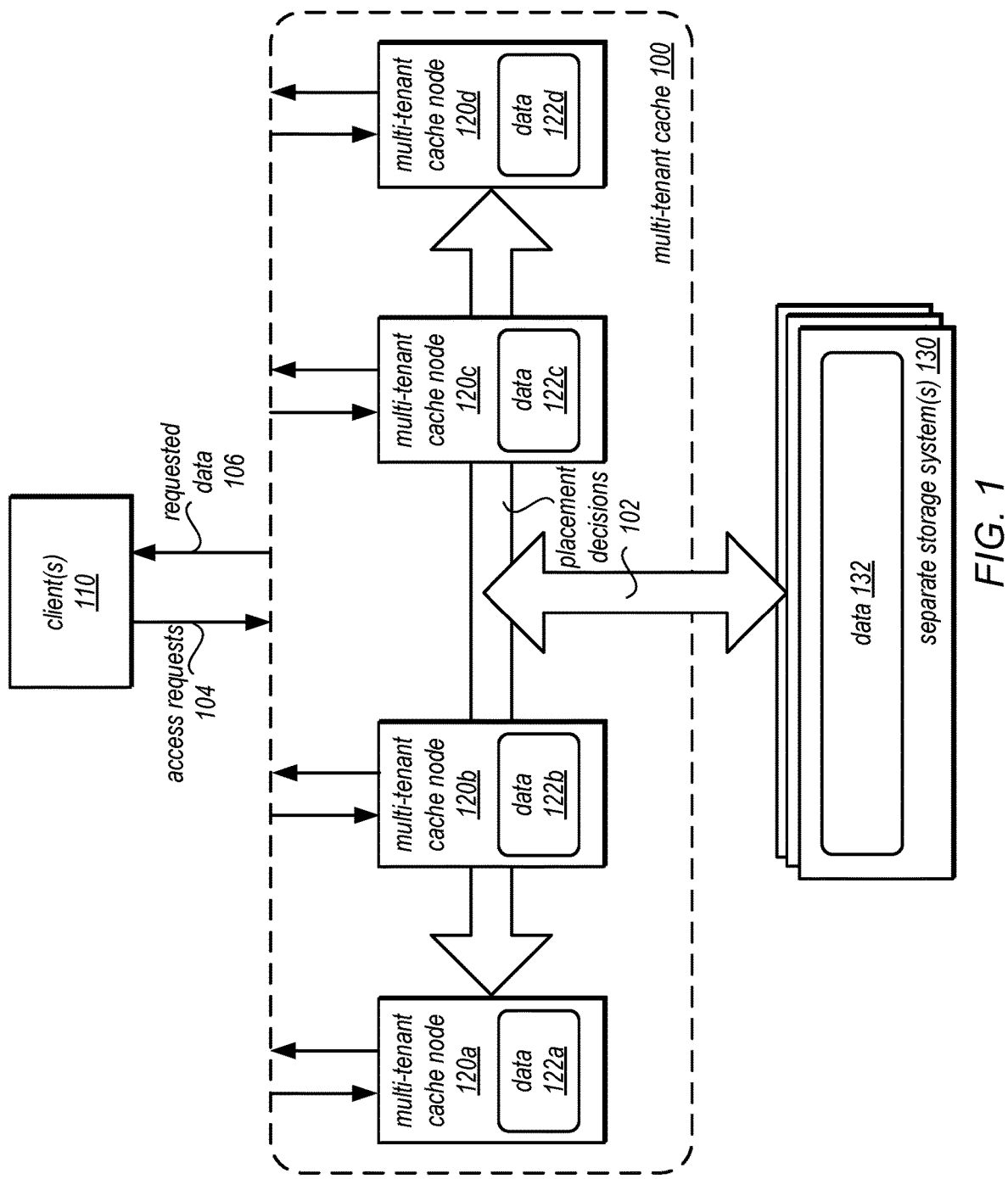
FIG. 1 is a logical block diagram of making decisions for placing data for in a multi-tenant cache, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for making decisions for placing data in a multi-tenant cache are described herein. Multi-tenant caches may improve the performance of various client systems, services, or application, such as the data warehouse service discussed below. A multi-tenant cache may distribute data across multiple different multi-tenant cache nodes, which may then respond to client application requests to provide data. A multi-tenant cache may implement a multi-tenant model for sharing the resources of an individual multi-tenant node across different users, entities, application, services, or other organizations. One multi-tenant node may, for example, store data for different tenants (e.g., users, entities, application, services, or other organizations) on the same node (e.g., in different ranges of memory or different storage devices implemented on the same node). A multi-tenant cache may still guarantee the privacy of data for tenants, preventing one tenant's data from being modified, returned, read, or otherwise accessed by another tenant.

Because a multi-tenant cache may support the distribution of data across multiple different multi-tenant cache nodes, the performance of various requests to obtain data (as well as different data processing operations) can be improved as the work to return data (and/or perform data processing operations on the data prior to the data being returned) can be distributed across a large number of nodes. Further performance improvements, however, can be gained by placing data preemptively into the multi-tenant cache so that it is present when likely to be used (e.g., so that the data does not have to be moved into the cache after a request to access the data is received at the multi-tenant cache). Because a multi-tenant cache may store data for multiple different tenants, usage patterns of data may vary. Therefore, techniques that for making decisions for placing data in a multi-tenant cache can account for varying usage, improving the performance of the multi-tenant cache and clients that dependent upon the multi-tenant cache to provide data, as discussed in detail below.

FIG. 1 is a logical block diagram of making decisions for placing data in a multi-tenant cache, according to some embodiments. Multi-tenant cache nodes, such as multi-tenant cache nodes 120a, 120b, 120c, and 120d, may provide a multi-tenant cache 100 for data 132, storing data 122a, 122b, 122c, and 122d in order to provide requested data 106 to access requests 104 received from clients 110. Multi-tenant cache nodes 120 may provide cache storage to speed the return of data 132 from other storage systems, such as separate storage system(s) 130 (which may not be able to return or otherwise provide requested data as quickly as a multi-tenant cache). In some embodiments, multi-tenant cache nodes 120 may implement additional data processing features to accelerate or otherwise improve data processing before returning data, such as by taking advantage of various hardware or other acceleration techniques, as discussed in detail below with regard to FIGS. 2-5.

Data may be placed among multi-tenant cache nodes 120 in order to improve performance of multi-tenant cache nodes 120 and client(s) 110. For example, if an access request is received at multi-tenant cache node 120a that accesses data not present on that node (or any other multi-tenant cache node in multi-tenant cache 100), then added latency/costs to obtain the data 122a from data 132 in separate storage system(s) 130 may be incurred. If, however, a placement decision 102 were made to proactively store data 122a on multi-tenant cache node 120a before an access request for that data was received, then significant performance savings can be achieved (as the data would not have be fetched in order to perform the query).

Placement decisions 102 may indicate when to place data and where to place data, in some embodiments, so that the data may be present in the multi-tenant cache 100 at one or more multi-tenant cache nodes 120 when needed. Placement decisions can also be used to distribute data processing workloads (e.g., for providing query results) as data for multiple tenants can be efficiently co-located without exceeding the capacities of a given multi-tenant cache node 120 by storing or removing different tenant data from multi-tenant cache nodes. As discussed in detail below with regard to FIGS. 6-9, placement decisions 102 can be made based on the application of usage prediction techniques to usage information in order to make placement decisions based on the likelihood of data access. In this way, placement decisions can anticipate and improve the performance of a multi-tenant cache beyond the hardware or software techniques implemented on multi-tenant cache nodes alone by placing data in the best place at the best time.

Please note that the previous description of making decisions for placing data in a multi-tenant cache is a logical illustration and thus is not to be construed as limiting as to the implementation of clients, multi-tenant cache nodes, or storage systems.

This specification begins with a general description of a provider network that implements multiple different services, including data processing services and a query acceleration service which may implement making decisions for placing in a multi-tenant cache. Then various examples of multiple data processors, such as a data warehouse service and a query acceleration service, including different components/modules, or arrangements of components/module that may be employed as part of implementing the data processors are discussed. A number of different methods and techniques to implement making decisions for placing data in a multi-tenant cache are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
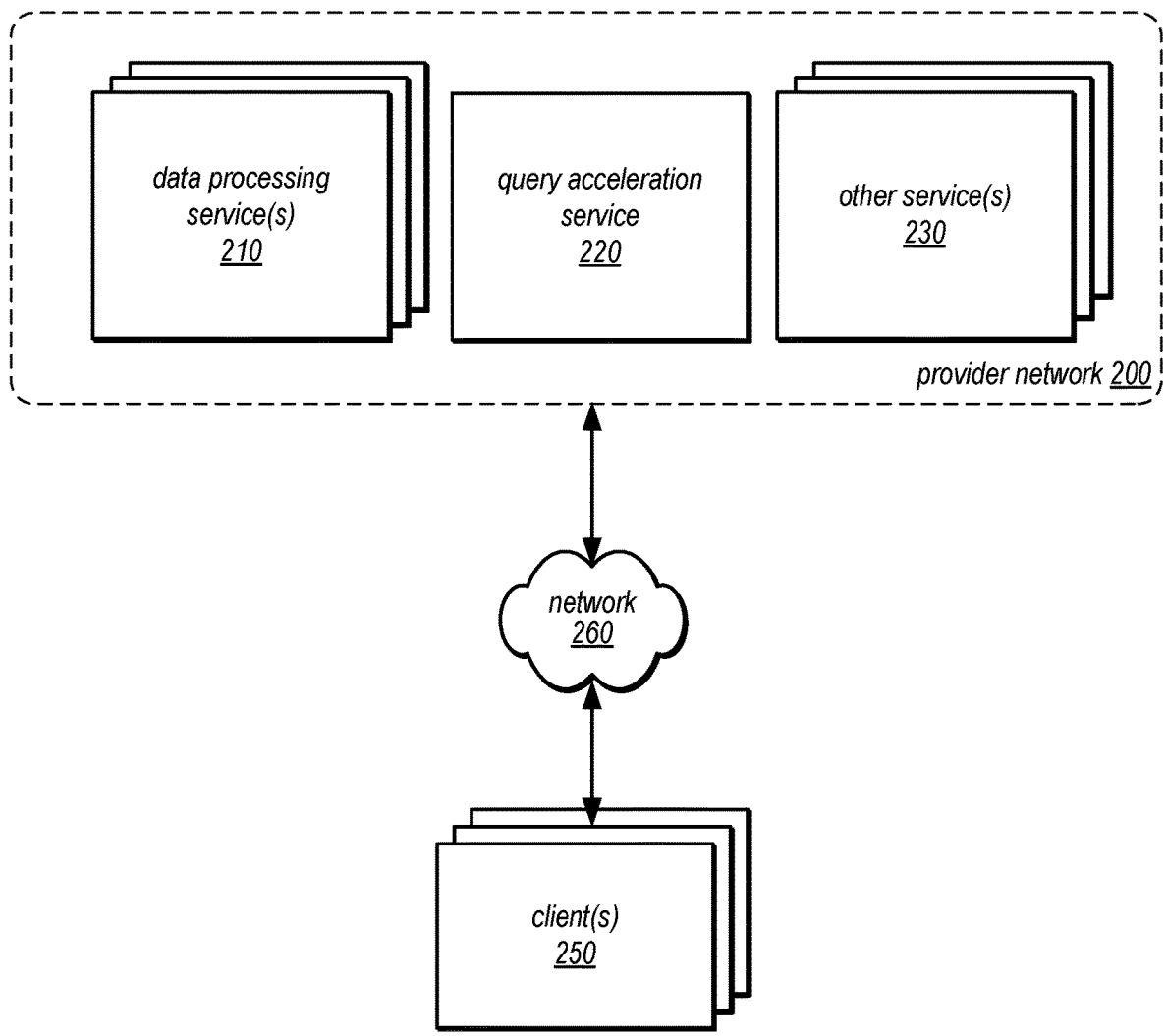
FIG. 2 is a logical block diagram illustrating a provider network offering data processing services that utilize a query acceleration service, according to some embodiments.

FIG. 2 is a logical block diagram illustrating a provider network offering data processing services that utilize a query acceleration service, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as data processing service(s) 210, (e.g., a map reduce service, a data warehouse service, and other large scale data processing services or database services), query acceleration service 220, and other services 230 that may be any other type of network based services (which may include a virtual compute service and various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), dedicated circuitry, or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data processing service 210, query acceleration service 220, or other service 230) may be implemented by a particular node or may be distributed across several nodes. In some embodiments, a given node may implement the functionality of more than one service system component (e.g., more than one data store component).

Data processing services 210 may be various types of data processing services that perform general or specialized data processing functions (e.g., anomaly detection, machine learning, data mining, big data querying, or any other type of data processing operation). For example, in at least some embodiments, data processing services 210 may include a map reduce service that creates clusters of processing nodes that implement map reduce functionality over data stored in the map reduce cluster as well as data stored in a data storage service (e.g. one of other service 230).

In another example, data processing service(s) 210 may include various types of database services (both relational and non-relational) for storing, querying, and updating data. Such services may be enterprise-class database systems that are highly scalable and extensible. Queries may be directed to these database services that are distributed across multiple physical resources, and the database may be scaled up or down on an as needed basis. The database may work effectively with database schemas of various types and/or organizations, in different embodiments. In some embodiments, clients/subscribers may submit queries in a number of ways, e.g., interactively via an SQL interface to the database system. In some embodiments, external applications and programs may submit queries using Open Database Connectivity (ODBC) and/or Java Database Connectivity (JDBC) driver interfaces to the database system. For instance, data processing service(s) 210 may implement, in some embodiments, a data warehouse service, such as discussed below with regard to FIG. 3 that utilizes another data processing service, such as query acceleration service 220, to execute portions of queries or other access requests with respect to data (which may be stored in query acceleration service 220 or in a remote data store, such as a provider network 200 data storage service (or a data store external to provider network 200).

Query acceleration service 220, as discussed in more detail below with regard to FIGS. 3-6, may provide a service supporting many data analytics operations implemented on dedicated circuitry, such as Field Programmable Gate Arrays (FPGAs), system-on-a-chip (SoC) or Application Specific Integrated Circuits (ASICs), in some embodiments.

Query acceleration service 220 may perform requested operations, such as scan operations that filter out data results according to string or numeric value comparisons, aggregation operations that aggregate data values and provide partial or complete aggregation results, or other operations that organize or reduce the determined data results retrieved from storage using circuitry dedicated to and optimized for the performance such operations. For example, query acceleration service 220 may execute different operations that are part of a larger query plan generated at a data processing service 210 (such as discussed below with regard to FIG. 4 and provide results to the data processing service 210 by relying upon requests from data processing service(s) 210 to determine the different operations to perform. In this way, query acceleration service 220 may be implemented as a dynamically scalable and stateless analytics processing service that is fault tolerant without the need to support complex query planning and execution for multiple different analytics operations that can be performed faster and using less resources with hardware implementations of the analytics operations. Instead, query acceleration service 220 may offer a set of data processing capabilities to filter or otherwise retrieve data.

In some embodiments, other service(s) 230 may implement different types of data stores for storing, accessing, and managing data on behalf of clients 250 as a network-based service that enables clients 250 to operate a data storage system in a cloud or network computing environment. Data storage service(s) may also include various kinds of object or file data stores for putting, updating, and getting data objects or files. For example, one data storage service may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, such data storage service(s) may be treated as a data lake. For example, an organization may generate many different kinds of data, stored in one or multiple collections of data objects in a data storage service. The data objects in the collection may include related or homogenous data objects, such as database partitions of sales data, as well as unrelated or heterogeneous data objects, such as audio files and web site log files. Data storage service(s) may be accessed via programmatic interfaces (e.g., APIs) or graphical user interfaces. For example, query acceleration service 220 may access data objects stored in data storage services via the programmatic interfaces.

Generally speaking, clients 250 may encompass any type of client that can submit network-based requests to provider network 200 via network 260, including requests for storage services (e.g., a request to query a data processing service 210, or a request to create, read, write, obtain, or modify data in data storage service(s), etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210, query acceleration service 220, or storage resources in other service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon data processing service (s) 210 to execute various queries for data already ingested or stored in the data processing service (e.g., such as data maintained in a data warehouse service, like data warehouse service 300 in FIG. 3 below) or data stored in a data lake hosted in data storage service(s) by performing federated data processing between the data processing service 210 and query acceleration service 220 (as discussed below with regard to FIG. 5). In some embodiments, clients of data processing services 210, query acceleration service 220, and/or other service(s) 230 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Clients 250 may convey network-based services requests (e.g., access requests to read or write data may be directed to data in data storage service(s) 230, operations, tasks, or jobs, being performed as part of data processing service(s) 220, or to interact with data catalog service 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
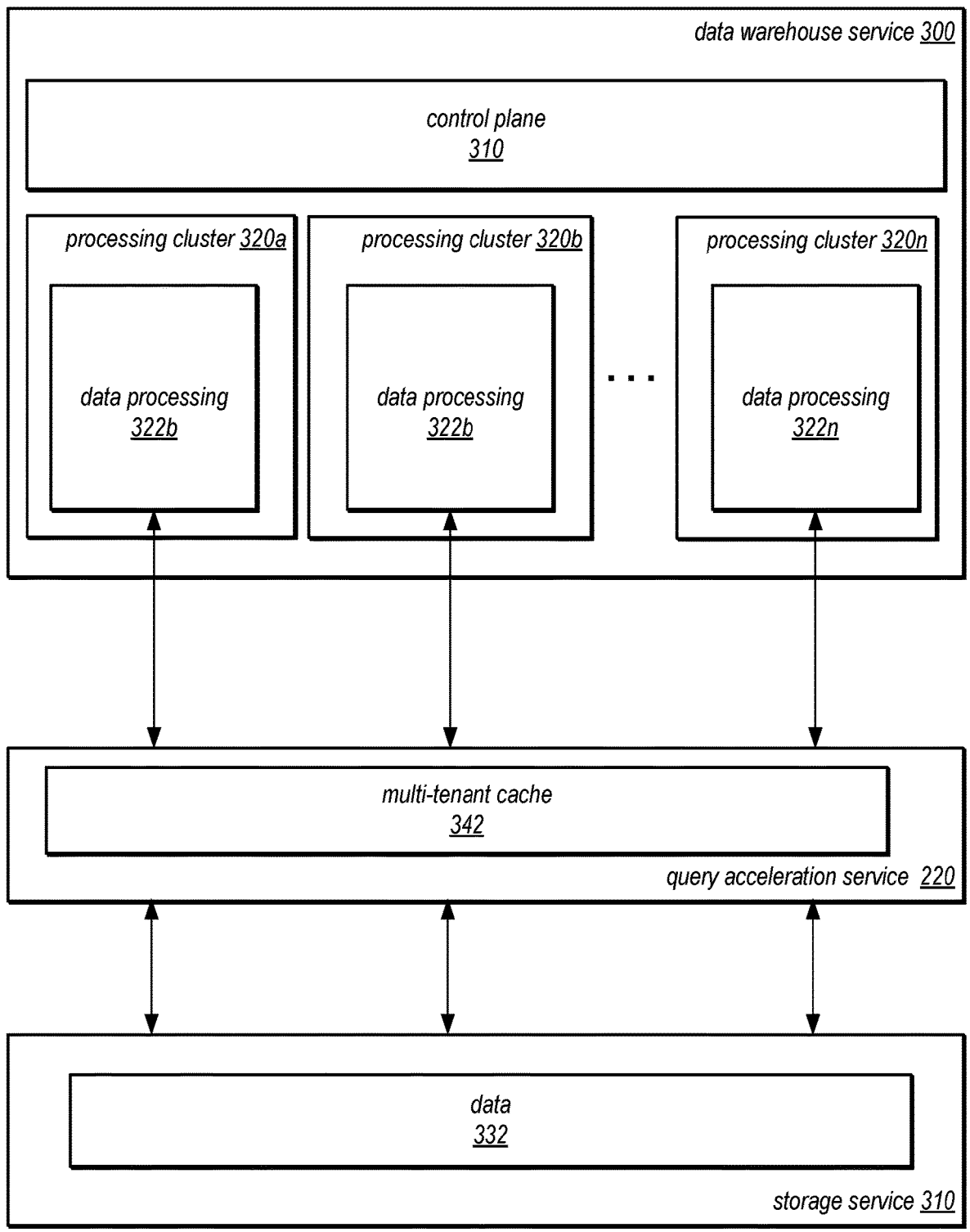
FIG. 3 is a logical block diagram of a data warehouse service that uses a query acceleration service to perform data analytics operations using a multi-tenant cache, according to some embodiments.

In at least some embodiments, one of data processing service(s) 220 may be a data warehouse service. FIG. 3 is a logical block diagram of a data warehouse service that uses a query acceleration service to perform data analytics operations, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 1000 described below with regard to FIG. 10. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300.

As discussed above, various clients (or customers, organizations, entities, or users) may wish to store and manage data using a data management service. Processing clusters may respond to various requests, including write/update/store requests (e.g., to write data into storage) or queries for data (e.g., such as a Server Query Language request (SQL) for particular data), as discussed below with regard to FIG. 5, along with many other data management or storage services. Multiple users or clients may access a processing cluster to obtain data warehouse services. In at least some embodiments, a data warehouse service 300 may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 320a, 320b, through 320n, hosted by the data warehouse service 300 may provide an enterprise-class database query and management system that allows users to send data processing requests to be executed by the clusters 320, such as by sending a query to a cluster control interface implemented by the network-based service. Processing clusters 320 may perform data processing 322 operations with respect to data stored locally in a processing cluster, as well as remotely stored data. For example, another service, like query acceleration service 220 may implement multi-tenant cache 342, which may store data for different users, accounts, or other entities of data warehouse service 300 as different tenants in order provide back data from multi-tenant cache 342 for performing queries or other data processing requests. Query acceleration service 220 may have access to stored data 332 in storage service 310 (e.g., an object storage service, other database service, etc.), which may be accessed to move data into multi-tenant cache 342 before being sent to a processing cluster 320. For example, queries sent to a processing cluster 320 may be directed to local data stored in the processing cluster and/or remotely stored data 332. Therefore, processing clusters may implement data processing, such as data processing 322a, 322b, and 322c to plan and execute the performance of queries with respect to local data in the processing cluster, as well as acting as a remote data processing client to direct execution of different operations determined as part of the query plan generated at the processing cluster that are assigned to query acceleration service 220 with respect to processing remote data 332. In at least some embodiments, data processing 322 may support some analytics operations by relying upon query acceleration service 220 to perform operations, such as a query with a regular expression as a predicate, with respect to data 332.

Figure 4:
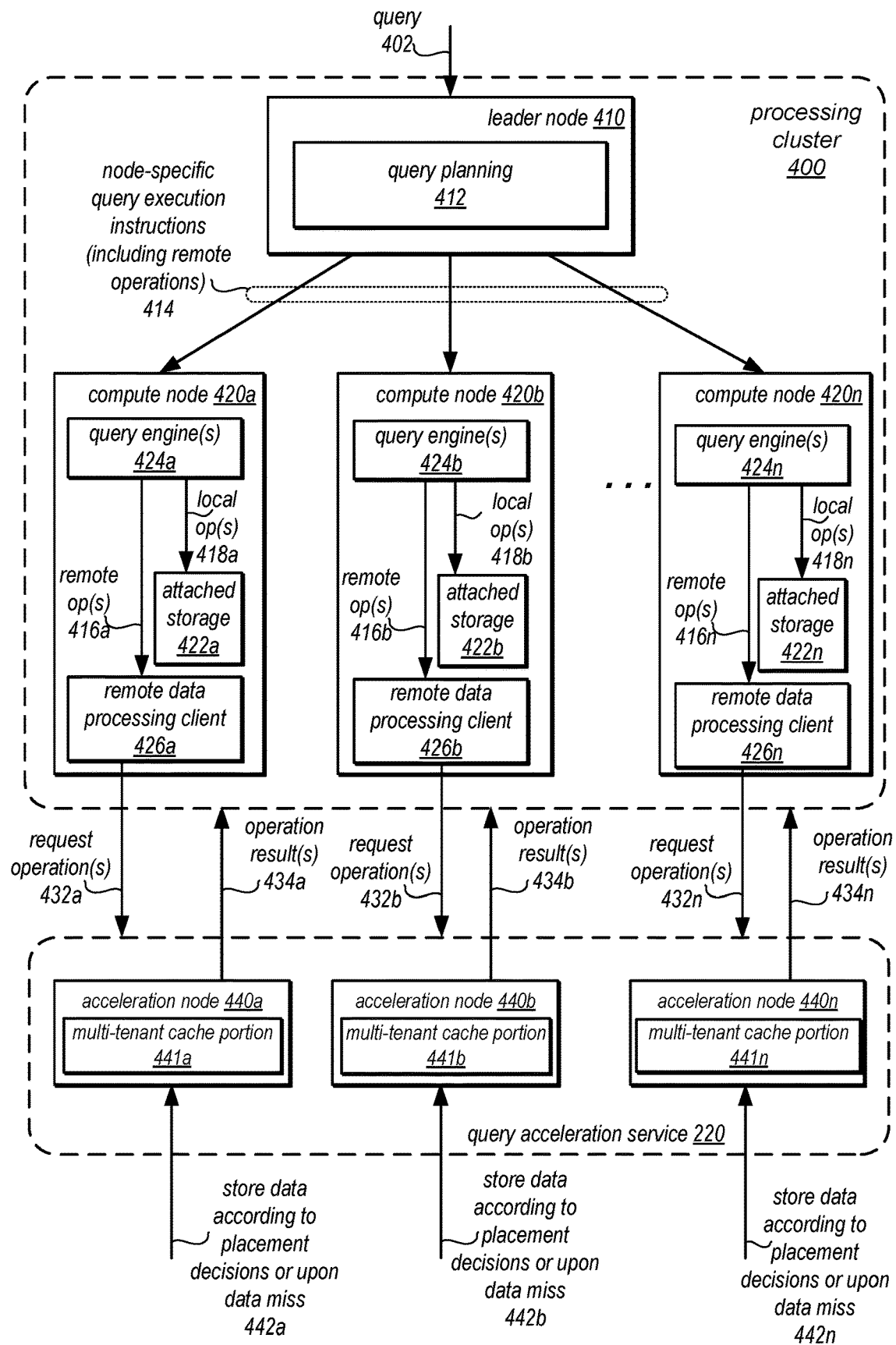
FIG. 4 is a logical block diagram illustrating an example processing cluster of a data warehouse service using a query acceleration service to perform a query, according to some embodiments.

FIG. 4 is a logical block diagram illustrating an example processing cluster of a data warehouse service using a query acceleration service to perform a query, according to some embodiments. Processing cluster 400 may be data warehouse service cluster, like processing clusters 320 discussed above with regard to FIG. 3, or another processing cluster that distributes execution of a query among multiple processing nodes. As illustrated in this example, a processing cluster 400 may include a leader node 410 and compute nodes 420a, 420b, and 420n, which may communicate with each other over an interconnect (not illustrated). Leader node 410 may implement query planning 412 to generate query plan(s) and instructions 414 for executing queries on processing cluster 400 that perform local and/or remote query operations, including operations to performing matching on regular expressions as discussed in further detail below. As described herein, each node in a processing cluster 400 may include attached storage, such as attached storage 422a, 422b, and 422n, on which a database (or portions thereof) may be stored on behalf of clients (e.g., users, client applications, and/or storage service subscribers). In other embodiments, compute nodes 420 may not implement attached storage 422, but instead may rely upon query acceleration service to retrieve and send data (e.g., unfiltered as stored on disk or with various operations/filters applied) in order to perform query 402.

Note that in at least some embodiments, query processing capability may be separated from compute nodes, and thus in some embodiments, additional components may be implemented for processing queries. Additionally, it may be that in some embodiments, no one node in processing cluster 400 is a leader node as illustrated in FIG. 4, but rather different nodes of the nodes in processing cluster 400 may act as a leader node or otherwise direct processing of queries to data stored in processing cluster 400. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 400 may be implemented as part of a data warehouse service, as discussed above with regard to FIG. 3, or another one of data processing service(s) 210. Leader node 410 may manage communications with clients, such as clients 250 (or internal provider network clients) as discussed above with regard to FIG. 2. For example, leader node 410 may be a server that receives a query 402 from various client programs (e.g., applications) and/or subscribers (users), then parses them and develops an execution plan (e.g., query plan(s)) to carry out the associated database operation(s)). More specifically, leader node 410 may develop the series of steps necessary to obtain results for the query. Query 402 may be directed to data that is stored locally within processing cluster 400 (e.g., at one or more of compute nodes 420), remotely in query acceleration service 220 or another storage service or data store accessible to query acceleration service 220.

Leader node 410 may also manage the communications among compute nodes 420 instructed to carry out database operations for data stored in the processing cluster 400. For example, node-specific query instructions 414 may be generated or compiled code that is distributed by leader node 410 to various ones of the compute nodes 420 to carry out the steps needed to perform query 402, including executing the code to generate intermediate results of query 402 at individual compute nodes may be sent back to the leader node 410. Leader node 410 may receive data and query responses or results from compute nodes 420 in order to determine a final result for query 402. A database schema, data format and/or other metadata information for the data stored among the compute nodes, such as the data tables stored in the cluster, may be managed and stored by leader node 410. Query planning 412 may account for remotely stored data by generating node-specific query instructions that include remote operations to be directed by individual compute node(s) 420.

Processing cluster 400 may also include compute nodes, such as compute nodes 420a, 420b, and 420n. Compute nodes 420, may for example, be implemented on servers or other computing devices, such as those described below with regard to computer system 1000 in FIG. 10, and each may include individual query processing "slices" defined, for example, for each core of a server's multi-core processor, one or more query processing engine(s), such as query engine(s) 424a, 424b, and 424n, to execute the instructions 414 or otherwise perform the portions of the query plan assigned to the compute node. Query engine(s) 424 may access a certain memory and disk space in order to process a portion of the workload for a query (or other database operation) that is sent to one or more of the compute nodes 420. Query engine 424 may access attached storage, such as 422a, 422b, and 422n, to perform local operation(s), such as local operations 418a, 418b, and 418n. For example, query engine 424 may scan data in attached storage 422, access indexes, perform joins, semi joins, aggregations, or any other processing operation assigned to the compute node 420.

Query engine 424a may also direct the execution of remote data processing operations, by providing remote operation(s), such as remote operations 416a, 416b, and 416n, to remote data processing clients, such as remote data processing client 426a, 426b, and 426n. Remote data processing clients 426 may be implemented by a client library, plugin, driver or other component that sends request operations, such as request operation(s) 432a, 432b, and 432n to query acceleration service 220. In some embodiments, query acceleration service 220 may implement a common network endpoint to which request operation(s) 432 are directed, and then may dispatch the requests to respective acceleration nodes, such as acceleration nodes 440a, 440b, and 440n. Acceleration nodes 440 may store data as a node in a respective portion of a multi-tenant cache (e.g., multi-tenant cache portions 441a, 441b, and 441n) according to placement decisions, or if data is not present in the acceleration node may request/obtain data from the separate storage service, as indicated at 442a, 442b, and 442n respectively.

Remote data processing clients 426 may read, process, or otherwise obtain results from acceleration nodes, including partial results of different operations (e.g., a stream of filtered tuples) and may provide operation result(s), including result(s) 434a, 434b, and 434c, back to query engine(s) 424, which may further process, combine, and/or include them with results of local operations 418, or further finalizing processing of the query if no local operations 418 are invoked for query 402.

Compute nodes 420 may send intermediate results from queries back to leader node 410 for final result generation (e.g., combining, aggregating, modifying, joining, etc.). Remote data processing clients 426 may retry operation request(s) 432 that do not return within a retry threshold.

Attached storage, such as attached storage 422*a*, 422*b*, and 422*n* may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 5:
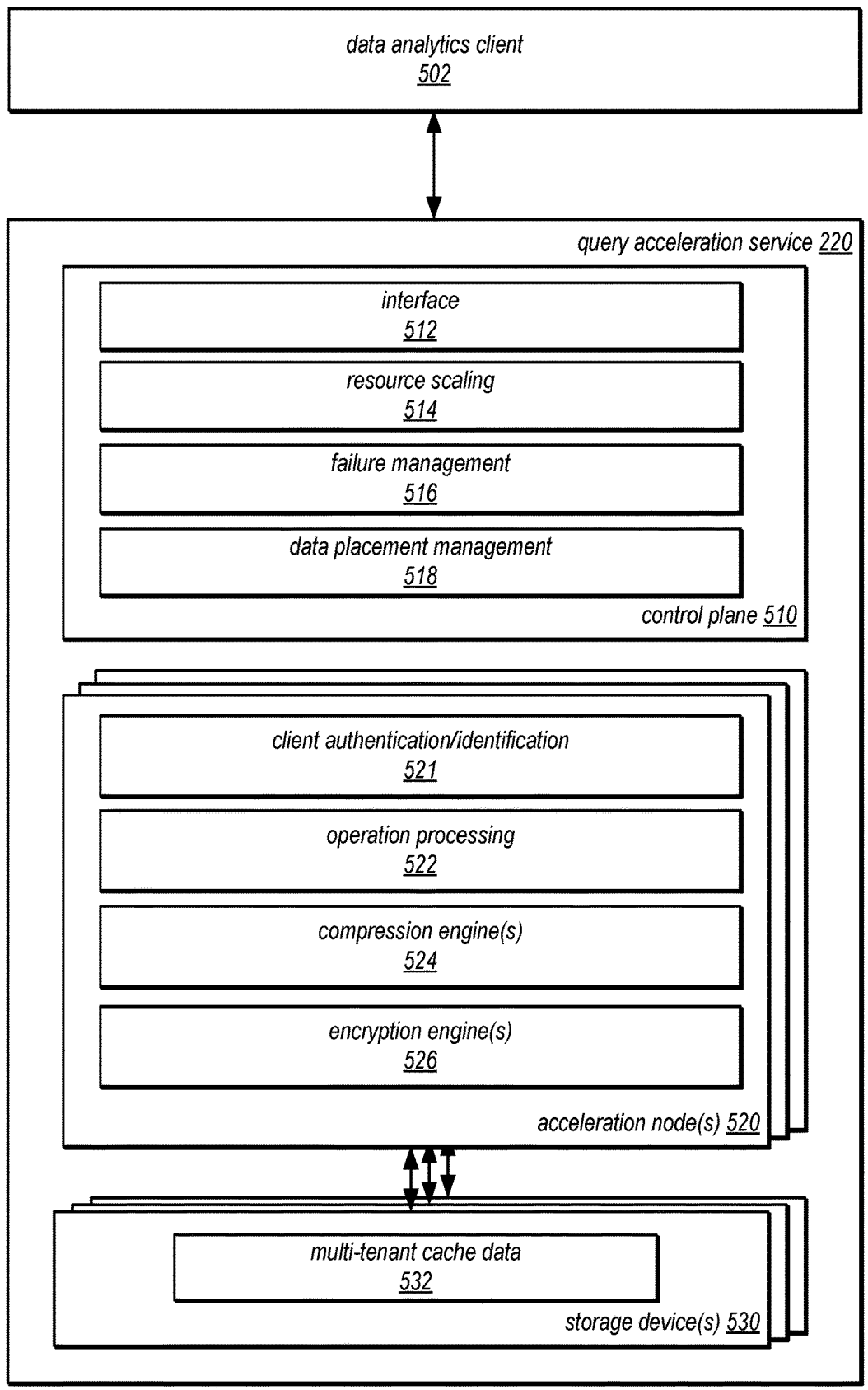
FIG. 5 is a logical block diagram illustrating a query acceleration service that implements making decisions for placing data for query acceleration, according to some embodiments.

FIG. 5 is a logical block diagram illustrating a query acceleration service that implements making decisions for placing data for query acceleration, according to some embodiments. As noted above in FIG. 2, query acceleration service 220 may receive requests to perform processing operations with respect to data stored 532 stored in a data storage service. Processing requests may be received from a client, such as remote data analytics client(s) 502 (which may another data processing service 210, like data warehouse service 300 or another data processing client, such as a database engine/cluster or map reduce cluster implemented outside of provider network 200 and communicating with query acceleration service 220 in order to process queries with respect to data stored within provider network 200 or to process data stored outside of provider network 200 (when the data is made accessible to query acceleration service 220).

Query acceleration service 220 may implement a control plane 510 and multiple acceleration node(s) 520 to execute processing requests received from remote data processing client(s) 502. Control plane 510 may arbitrate, balance, select, or dispatch requests to different processing node(s) 520 in various embodiments, such as dispatching requests to those acceleration node(s) 520 that store different portions of data for a received request, according to a placement decision. Control plane 510 may implement interface 512 which may be a programmatic interface, such as an application programming interface (API), that allows for requests to be formatted according to the interface 512 to programmatically invoke operations. In some embodiments, the API may be defined to allow operation requests defined as objects of code generated at and sent from remote data processing client(s) 502 (based on a query plan generated at remote data processing client(s) 502) to be compiled or executed in order to perform the assigned operations at query acceleration service 220.

In some embodiments, query acceleration service 220 may implement request routing as part of data placement management 518 to distribute remote processing requests across different acceleration node(s) 520 according to placement decisions made, as discussed below with regard to FIG. 6.

Query acceleration service 220 may also implement resource scaling 514. Resource scaling 514 may detect when the current request rate or workload upon a current number of acceleration node(s) 520 exceeds or falls below over-utilization or under-utilization thresholds for processing nodes. In response to detecting that the request rate or workload exceeds an over-utilized threshold, for example, then resources scaling 514 may provision, spin up, activate, repurpose, reallocate, or otherwise obtain additional acceleration node(s) 520 to perform received remote data processing requests. Similarly, the number of acceleration node(s) 520 could be reduced by resource scaling 514 in the event that the request rate or workload of acceleration node(s) falls below the under-utilization threshold.

Query acceleration service 220 may also implement failure management 516 to monitor acceleration node(s) 520 and other components of query acceleration service 220 for failure or other health or performance states that may need to be repaired or replaced. For example, failure management 516 may detect when an acceleration node fails or becomes unavailable (e.g., due to a network partition) by polling processing node(s) 520 to obtain health or performance status information. Failure management may initiate shutdown or halting of processing at failing acceleration node(s) 520 and provision replacement acceleration node(s) 520.

Figure 10:
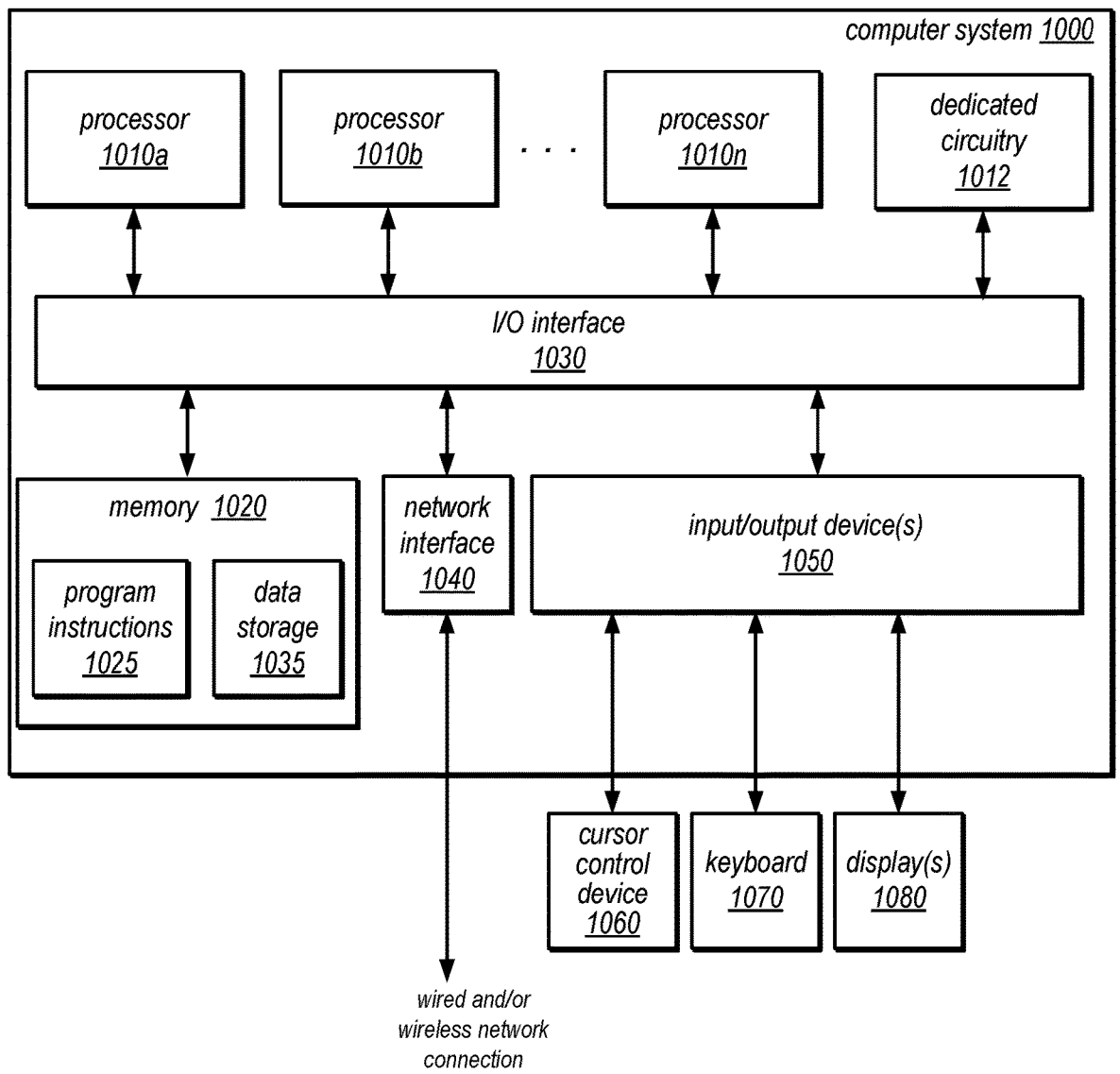
FIG. 10 illustrates an example system that implements the various methods, techniques, and systems described herein, according to some embodiments.

Acceleration node(s) 520 may be implemented as separate computing nodes, servers, or devices, such as computing systems 1000 in FIG. 10, to perform data processing operations on behalf of remote data processing client(s) 502. Acceleration node(s) 520 may implement stateless, in-memory processing to execute operations, in some embodiments. In this way, processing node(s) 520 may have fast data processing rates. Acceleration node(s) 520 may implement client authentication/identification 521 to determine whether a remote data processing client 502 has the right to access data 532. For example, client authentication/identification 521 may evaluate access credentials, such as a username and password, token, or other identity indicator by attempting to connect with storage device 530. If the credentials are not valid, then the data processing node 502 may send an error indication to remote data analytics client 502.

Acceleration node(s) 520 may implement operation processing 522 which may perform multiple different processing operations to perform various analytics operations upon data 532 before returning operation results and/or retrieve data without modification or analysis. In some embodiments, data 532 may be stored in encrypted or compressed format. Processing node(s) 520 may implement compression engine(s) 524 to decompress data 532 according to a compression technique identified for data 532, such as lossless compression techniques like run-length encoding, Lempel-Ziv based encoding, or bzip based encoding. Processing node(s) 520 may implement encryption engine(s) 526 to decrypt data 532 according to an encryption technique and/or encryption credential, such as a key, identified for data 532, such as symmetric key or public-private key encryption techniques.

In some embodiments, acceleration node(s) 530 may be directly attached to one or more storage devices 530, which may store multi-tenant cache data 532. For example, storage devices 530 may include, but not be limited to: non-volatile memories or storage technologies, such as redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or volatile storage technologies, such as such as static random access memory (SRAM), synchronous dynamic RAM (SDRAM), or any other type of memory, or combinations thereof.

Figure 6:
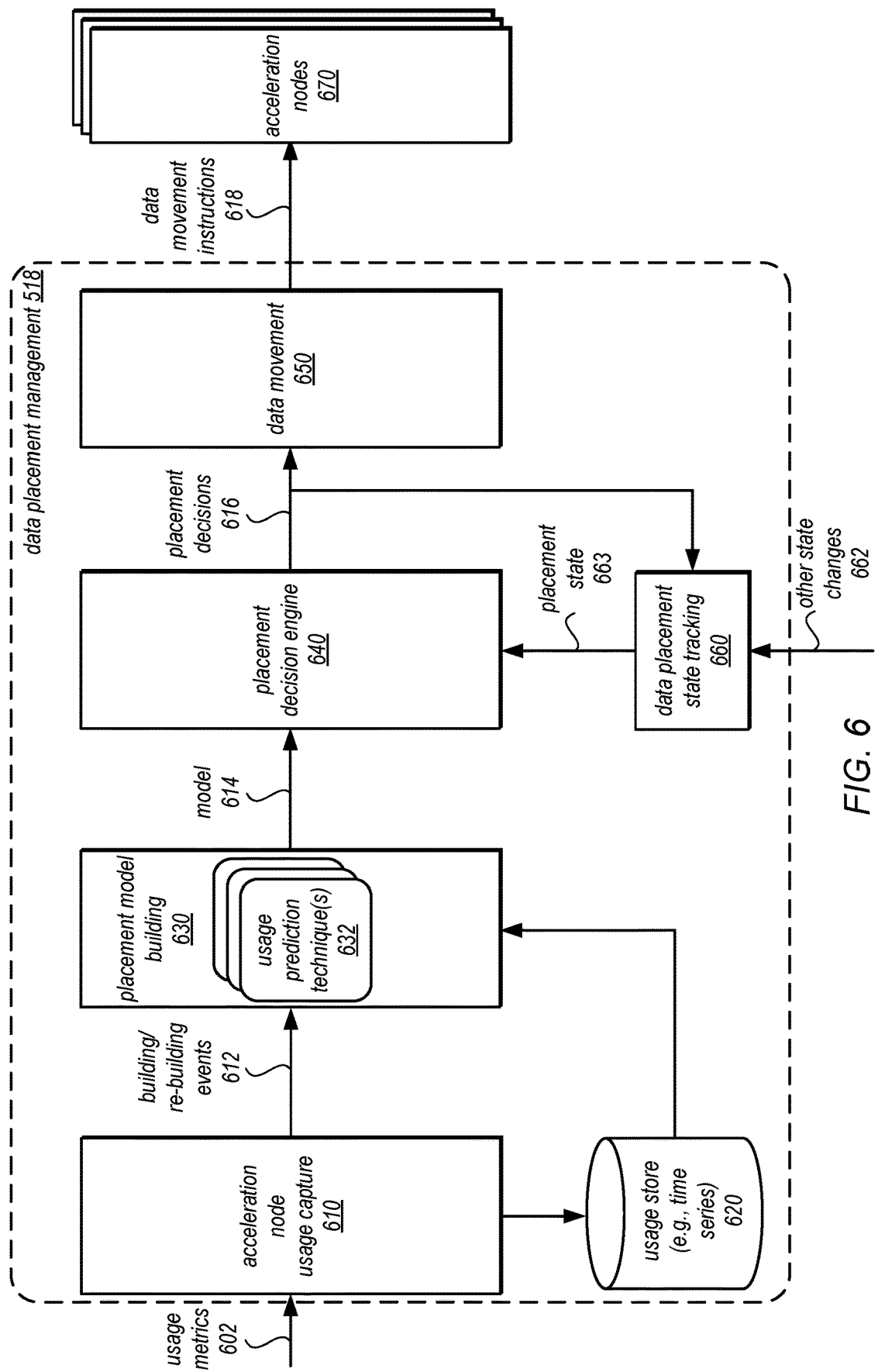
FIG. 6 is a logical block diagram of data placement management that applies usage prediction techniques to train models for making placement decisions for query acceleration, according to some embodiments.

FIG. 6 is a logical block diagram of data placement management that applies usage prediction techniques to train models for making placement decisions for query acceleration, according to some embodiments. Data placement management 518 make placement decisions and direct placement among acceleration nodes 670, in various embodiments. Usage metrics 602 may be captured, recorded, or otherwise obtained by acceleration node usage capture 610. For example, usage metrics may include the identity of data files, objects, or other data structures that are utilized to perform a query, the time at which the data is accessed, the client, account, or other indicator of the requesting tenant for that data, the costs of node resources (e.g., computational resources such as processor or other hardware devices utilized to perform operations), among other possible usage metrics. The time period over which usage occurs may vary, including such long time periods (e.g., weeks or months) or may be captured for smaller time periods (e.g., days or hours). Usage metrics may include various granularity of usage, such as the duration of data processing in minutes, seconds, or other time measures, the amount of data accessed, such as large data sizes in gigabytes or terabytes, or in smaller data sizes, such as megabytes or bytes.

Usage metrics may be continually captured, in some embodiments, and stored in usage store 620, which may be, for example, a time series database. In various embodiments, techniques to ensure efficient storage of metrics, such as hierarchical data structures and purging of irrelevant data (e.g., usage indicative of non-repetitive usage patterns) may be used, among others.

Placement model building 630 may utilize different usage prediction techniques 632. For example, usage prediction techniques may include various statistical analyses or evaluations, that weight the collected usage metrics for a particular user, client, or other tenant to produce a model for predicting usage or may rely upon various machine learning techniques to train a model, such as time series prediction technique (discussed in detail below with regard to FIG. 8) and/or reinforcement learning agent technique (discussed in detail below with regard to FIG. 9) in order to train or re-train to update models, responsive to building/events 612. For example, a re-building event may occur after a lapse in a period of time since a model was built (or rebuilt), or may occur when a threshold amount of new usage data is received, or may occur when a change is detected in usage information (e.g., change in usage frequency).

Model 614 may be provided to placement decision engine 640. Placement decision engine 640 may make placement decisions in various ways based on the models, as well as other information, such as the state indicated in prior placement decisions and/or other placement state 663. For example, data placement management 518 may implement data placement state tracking 660, which may track placement decisions (e.g., decisions to store or evict data from the multi-tenant cache). Data placement management 660 may also obtain other state changes 662, such as the failure of acceleration nodes (which may trigger a need to replace data that is no longer in a cache) or state changes to reduce the number of acceleration nodes, triggering a re-evaluation of data currently in the multi-tenant cache given a smaller number of acceleration nodes. As discussed below, a time series prediction model may be used, in some embodiments, to implement a cost minimization approach given a prediction of usage by a model 614. For a reinforcement learning agent approach, state information, policies, and/or other input data for a reinforcement learning agent may be maintained or updated as part of placement decision engine 640.

Placement decisions 616 may include schedules or other indications of the timing to add or remove data from a multi-tenant cache (including timings that are "as soon as possible"), as well as particular placement locations (e.g., in order to ensure that the capacity of an individual placement node is not exceeded). For example, placement decisions 616 may instruct that data for different tenants be co-located on a same acceleration node. Placement decisions may be provided to data movement 650, which may send out data movement instructions 618 according to placement decisions, in various embodiments. For example, data movement instructions 618 may orchestrate the addition or removal of data from one (or multiple) acceleration nodes 670 in accordance with a determine placement schedule.

Figure 7:
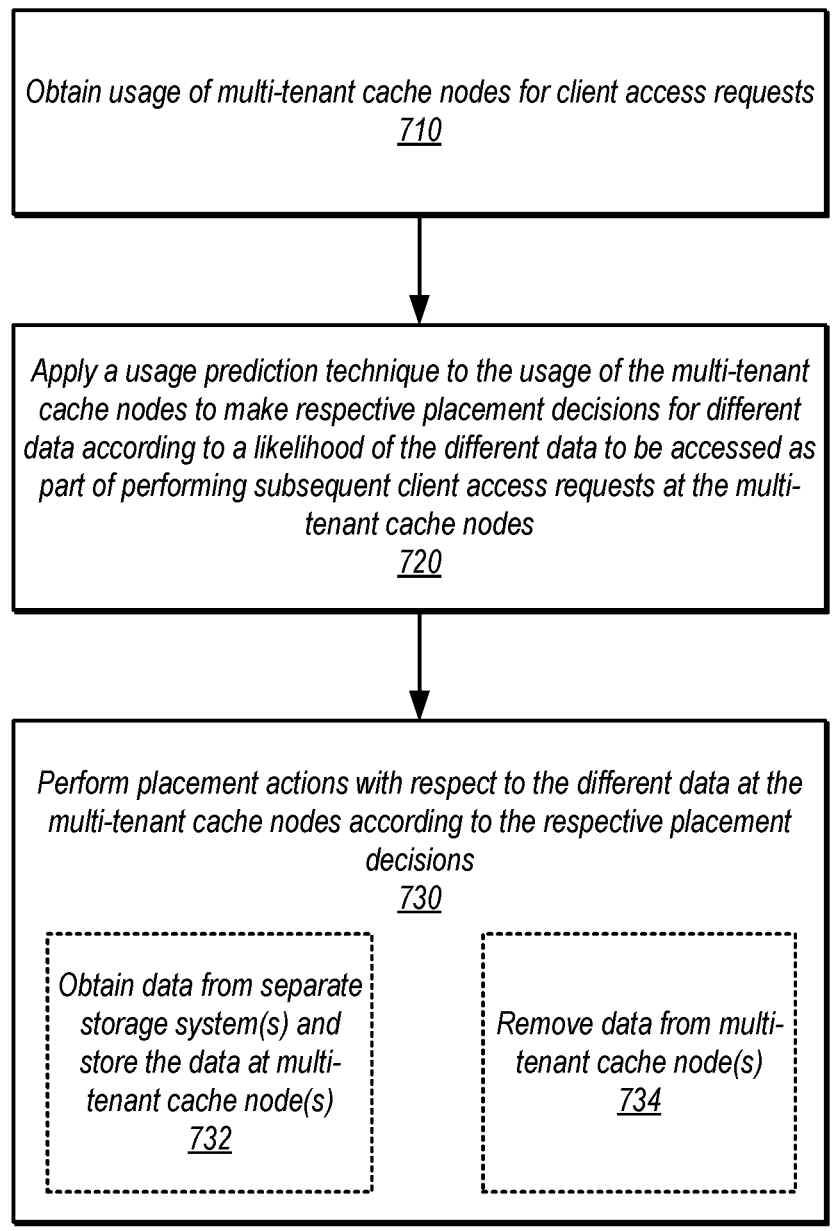
FIG. 7 is a high-level flowchart illustrating methods and techniques to implement making decisions for placing data in a multi-tenant cache, according to some embodiments.

Although FIGS. 2-6 have been described and illustrated in the context of a provider network implementing different data processing services, like a data warehousing service, that utilizes a query acceleration service, the various components illustrated and described in FIGS. 2-6 may be easily applied to other data processing systems that implement different multi-tenant caches that move data from storage to multi-tenant cache nodes. As such, FIGS. 2-6 are not intended to be limiting as to other embodiments of making decisions for placing data in a multi-tenant cache. FIG. 7 is a high-level flowchart illustrating methods and techniques to implement making decisions for placing data in a multi-tenant cache, according to some embodiments.

Various different systems and devices may implement the various methods and techniques described below, either singly or working together. Different combinations of services implemented in different provider networks operated by different entities may implement some or all of the methods (e.g., a data warehouse cluster in a service of a first provider network and a query acceleration service in a second provider network). Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 710, usage of multi-tenant cache nodes for client access requests may be obtained, in various embodiments. For example, usage information may be collected directly from multi-tenant cache nodes (e.g., reporting what data is accessed, such as the data objects accessed, the amount of data accessed, such as the size of the data objects accessed, what hardware is utilized to access, process, and/or return the data, and how much the hardware is utilized (e.g., is specialized hardware utilized), the tenant (e.g., client, account, entity, application, etc.) that made the access request, and so on). Usage information may also be collected from clients, in some embodiments. For instance, if a client is database system or data warehouse, as discussed above, then query execution statistics or other historical information may be sent or shared with a multi-tenant cache as usage information. As discussed above with regard to FIG. 6, usage information may be continually captured by recording which data has to be stored to multi-tenant cache nodes and by recording duration, device, component, unit, operation, or other multi-tenant cache node features that can be utilized (e.g., FPGA usage per client id, usage per second, etc.).

As indicated at 720, a usage prediction technique may be applied to the usage of the multi-tenant cache nodes to make respective placement decisions for different data according to a likelihood of the different data to be accessed as part of performing subsequent client access requests at the multi-tenant cache nodes, in some embodiments. For example, as discussed in detail below with regard to FIGS. 8 and 9, different machine learning techniques, such as regression analysis, time series evaluation, or reinforcement learning techniques may be used to train, generate, or build models that can be used to make placement decisions. Other usage prediction techniques may also be used that do not rely upon training techniques based on historical data but provide criteria to weight, analyze, or otherwise evaluate the obtained usage information to make a prediction of the likelihood of the data to be accessed for subsequent client access. As discussed above with regard to FIG. 6, other information, such as the state indicated in prior placement decisions and/or other placement state such as the failure of multi-tenant cache nodes may be used to make a placement decision. In one example, ensuring co-location of data for different tenants on a same multi-tenant cache node to ensure that the right amount of data is placed on a given multi-tenant cache node may rely upon the knowledge of tenant data already placed on a particular multi-tenant cache node to determine where to place a different tenant's data. For example, such other placement state may also concern scenarios in which a failure of a multi-tenant cache node may trigger a need to replace data that is no longer in the multi-tenant cache or state changes to reduce the number of multi-tenant cache nodes, triggering a re-evaluation of data currently in the multi-tenant cache given a smaller number of multi-tenant cache nodes.

As indicated at 730, placement decisions may be made with respect to the different data at the multi-tenant cache nodes according to the respective placement decisions, in some embodiments. For example, such placement actions may include obtaining data from separate storage system(s) and storing the data at particular multi-tenant cache nodes 732. Placement actions may also include removing data from multi-tenant cache nodes (e.g., instructing a multi-tenant cache node to evict data).

Figure 8:
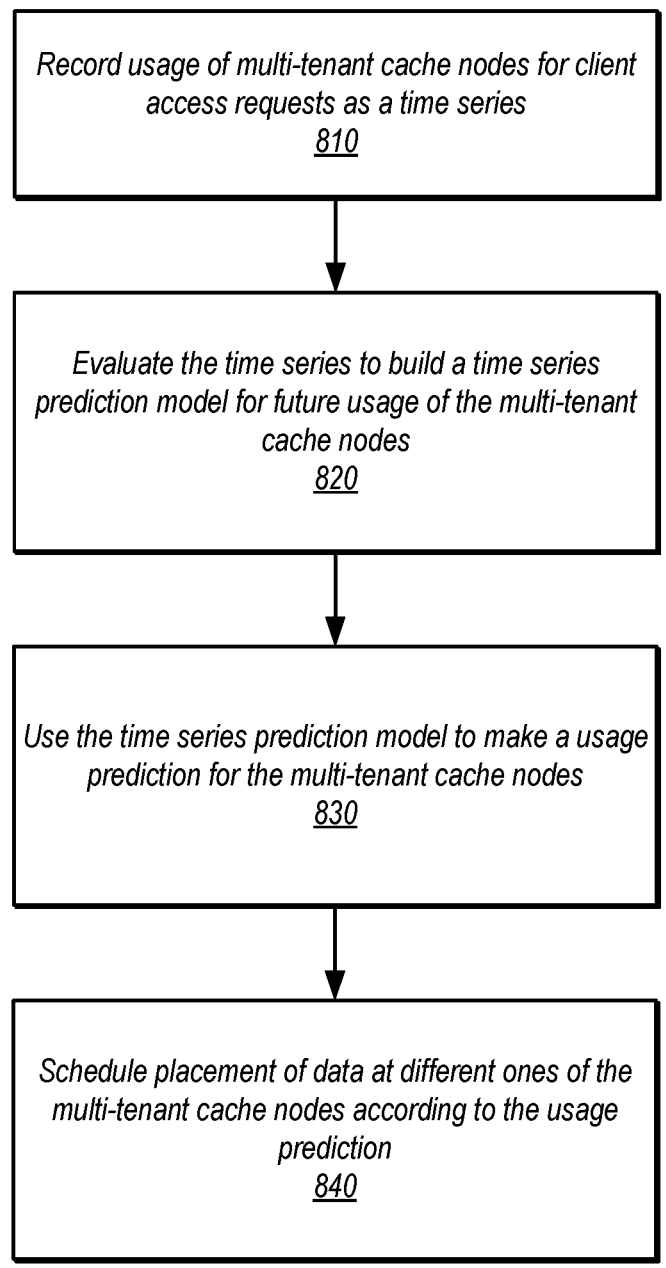
FIG. 8 is a high-level flowchart illustrating methods and techniques to implement time series prediction for making placement decisions, according to some embodiments.

FIG. 8 is a high-level flowchart illustrating methods and techniques to implement time series prediction for making placement decisions, according to some embodiments. As indicated at 810, usage of multi-tenant cache nodes for client access requests may be recorded as a time series. For example, the time series may be stored or written to a time series database.

As indicated at 820, the time series may be evaluated to build a time series prediction model for future usage of the multi-tenant cache nodes, in some embodiments. Various different time series prediction machine learning techniques may be applied to generate the time series prediction model. For example, training-based time series prediction techniques that use a Convolutional Neural Network (CNN), such as ones that use perform quantile regression using a causal CNN and Recurrent Neural Network (RNN) based technique that uses a RNN to provide a prediction model, and non-training prediction techniques, such as additive model-based prediction techniques where non-linear trends are fit with different time periods of seasonality (e.g., yearly, weekly, and daily), scalable, probabilistic baseline forecaster to handle time series data which may be sparse or intermittent (e.g., including different various for different types of features, such as seasonal, climatological, and a combination of seasonal and climatological), Autoregressive Integrated Moving Average (AMNIA), and Exponential Smoothing (ETS) (e.g., computing a weighted average over all observations in the time series dataset as its prediction, with exponentially decreasing weights over time).

As indicated at 830, the time series prediction model may be used to make a usage prediction for the multi-tenant cache nodes, in some embodiments. For example, a prediction horizon (e.g., 1 hour, 1 day, 1 week), may be used to return a prediction using the time series prediction model that predicts usage up to the prediction horizon (e.g., for the next hour, day, or week). In various embodiments, probabilities or confidences associated with a prediction may be provided. As indicated at 840, placement of data at different ones of the multi-tenant cache nodes may be scheduled according to the usage prediction, in various embodiments. For example, as discussed above with regard to FIG. 1, placement decisions may indicate when to move data to a multi-tenant cache node, when to remove data from a multi-tenant cache node, which particular multi-tenant cache node to move data to (e.g., in order to co-locate data that have compatible workloads), among other placement decisions. In some embodiments, cost minimization techniques may be used to minimize the expected cost of scenarios where data used for an access request is not presently stored in a multi-tenant cache node or the combination of data for different clients on a multi-tenant cache node leads to a workload overburdening or beyond the capacities of the multi-tenant cache node to perform the workload.

Figure 9:
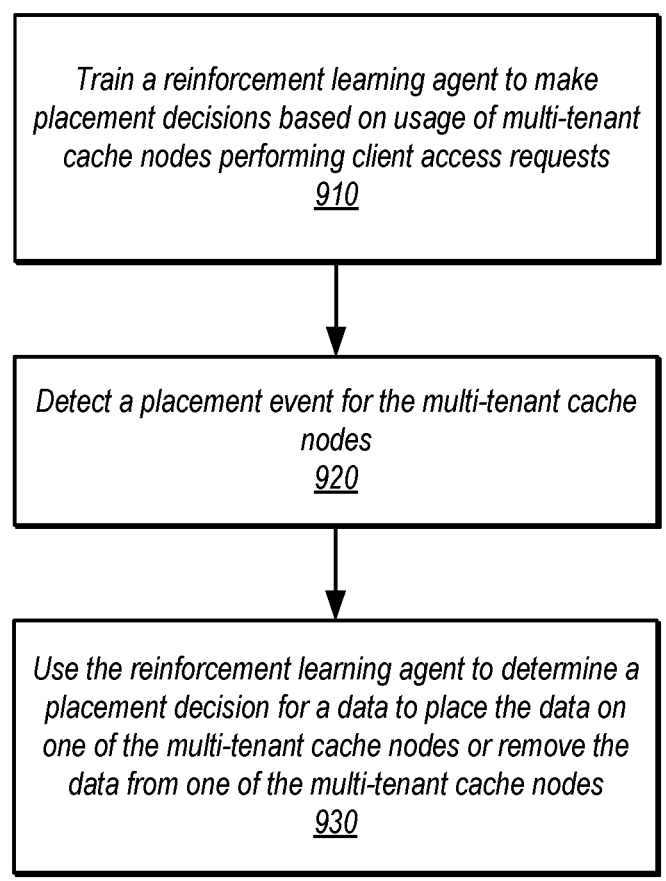
FIG. 9 is a high-level flowchart illustrating methods and techniques to implement reinforcement learning for making placement decisions, according to some embodiments.

FIG. 9 is a high-level flowchart illustrating methods and techniques to implement reinforcement learning for making placement decisions, according to some embodiments. As indicated at 910, a reinforcement learning agent may be trained to make placement decisions based on usage of multi-tenant cache nodes performing client access requests. For example, bin-packing or other online reinforcement learning techniques can be used to train the reinforcement learning agent by modeling the environment of placement decisions, agent placement decisions, transition probability, and a reward function for making placement decisions that store data in multi-tenant cache nodes that is likely to be accessed, as well as placing data together in multi-tenant cache nodes that have combined workloads that does not cause a multi-tenant cache node to be overloaded. In embodiments where a bin packing technique is utilized, a buffer or other safety margin may be enforced for multi-tenant cache nodes to prevent an unpredictable workload from exceeding a predicted usage.

As indicated at 920, a placement event may be detected for the multi-tenant cache nodes, in some embodiments. For example, a placement event may occur periodically (e.g., after the lapse of a time period) and/or upon other triggering events, such as the removal of data, the addition or removal of multi-tenant cache nodes, among others. As indicated at 930, the reinforcement learning agent may be used to determine a placement decision for data to place the data on one of the multi-tenant cache nodes, in some embodiments. For example, when a placement event occurs, the reinforcement learning agent may identify what data, when to place the data, and/or where to place the data (e.g., on what multi-tenant cache node).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of making decisions for placing data in a multi-tenant cache as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of computing devices, respectively comprising a processor and a memory, the plurality of computing devices configured to implement a query acceleration service;
wherein the query acceleration service comprises a plurality of acceleration nodes; and
wherein the query acceleration service is configured to:
perform a plurality of queries received from one or more clients of the query acceleration service at the plurality of acceleration nodes;
record usage of the plurality of acceleration nodes for the performance of the plurality of queries;
apply a usage prediction technique to the usage of the plurality of acceleration nodes to make respective placement decisions for storing different data at different ones of the plurality of acceleration nodes according to a likelihood of the different data to be accessed as part of performing subsequent client queries at the plurality of acceleration nodes;
send requests to one or more separate storage systems to obtain the different data; and
store the different data at the different ones of the plurality of acceleration nodes according to the respective placement decisions to make the different data available for performing the subsequent queries at the plurality of acceleration nodes when the subsequent queries are received.

2. The system of claim 1, wherein the usage of the plurality of acceleration nodes is recorded as a time series, and wherein to apply the usage prediction technique to the usage of the plurality of acceleration nodes to make respective placement decisions, the query acceleration service is configured to:
 evaluate the time series to build a time series prediction model for future usage of the plurality of acceleration nodes;
 use the time series prediction model to make a usage prediction for the plurality of acceleration nodes; and
 schedule placement of the different data at different ones of the plurality of acceleration nodes according to the usage prediction.

3. The system of claim 2, wherein the query acceleration service is further configured to:
 after recording further usage of the plurality of acceleration nodes for the performance of additional queries, update the time series prediction model based on the further usage of plurality of acceleration nodes.

4. The system of claim 1, wherein the query acceleration service is implemented as part of a provider network, wherein the one or more clients of the query acceleration service are respective processing clusters of a data warehouse service implemented as part of the provider network, and wherein the one or more separate storages systems is a storage service different from the data warehouse service and implemented as part of the provider network.

5. A method, comprising:
 obtaining usage of a plurality of multi-tenant cache nodes for a plurality of client access requests;
 applying a usage prediction technique to the usage of the plurality of multi-tenant cache nodes to make respective placement decisions for placing different data at different ones of the plurality of multi-tenant cache nodes according to a likelihood of the different data to be accessed as part of performing subsequent client access requests at the plurality of multi-tenant cache nodes; and
 performing placement actions with respect to the different data at different ones of the plurality of multi-tenant cache nodes according to the respective placement decisions, the different data being obtained from one or more separate storage systems.

6. The method of claim 5, wherein performing placement actions with respect to the different data comprises obtaining and storing the different data at the plurality of multi-tenant cache nodes.

7. The method of claim 5, wherein obtaining the usage of the plurality of multi-tenant cache nodes for the plurality of client access requests comprises obtaining the usage from the plurality of multi-tenant cache nodes.

8. The method of claim 5, wherein obtaining the usage of the plurality of multi-tenant cache nodes for the plurality of client access requests comprises obtaining at least some of the usage from one or more clients that submitted the client access requests.

9. The method of claim 5, wherein the usage of the plurality of multi-tenant cache nodes is recorded as a time series, and wherein applying the usage prediction technique to the usage of the plurality of multi-tenant cache nodes to make respective placement decisions comprises:
 evaluating the time series to build a time series prediction model for future usage of the plurality of multi-tenant cache nodes;
 using the time series prediction model to make a usage prediction for the plurality of multi-tenant cache nodes; and
 scheduling placement of the different data at different ones of the plurality of multi-tenant cache nodes according to the usage prediction.

10. The method of claim 9, further comprising:
 after obtaining further usage of the plurality of multi-tenant cache nodes for the performance of additional access requests, updating the time series prediction model based on the further usage of plurality of multi-tenant cache nodes.

11. The method of claim 10, wherein updating the time series prediction model is performed responsive to detecting a usage change for the plurality of multi-tenant cache nodes based on the further usage of the plurality of multi-tenant cache nodes.

12. The method of claim 5, wherein applying the usage prediction technique to the usage of the plurality of multi-tenant cache nodes to make respective placement decisions comprises:
 training a reinforcement learning agent to make placement decisions based on the usage of the plurality of multi-tenant cache nodes; and
 using the reinforcement learning agent to determine the respective placement decisions.

13. The method of claim 5, wherein performing placement actions with respect to the different data comprises removing at least a portion of data at one of the plurality of multi-tenant cache nodes.

14. One or more non-transitory, computer-readable storage media, storing program instructions that when executed on or across one or more computing devices cause the one or more computing devices to implement:
 recording usage of a plurality of multi-tenant cache nodes for a plurality of client access requests;
 applying a machine learning technique to the usage of the plurality of multi-tenant cache nodes to make respective placement decisions at different ones of the plurality of multi-tenant cache nodes according to a likelihood of different data to be accessed as part of performing subsequent client access requests at the plurality of multi-tenant cache nodes; and
 causing performance of placement actions with respect to the different data at the different ones of the plurality of multi-tenant cache nodes according to the respective placement decisions, the different data being obtained from one or more separate storage systems.

15. The one or more non-transitory, computer-readable storage media of claim 14, wherein the respective placement decisions indicate which portions of the different data to co-locate on a same one of the plurality of multi-tenant cache nodes.

16. The one or more non-transitory, computer-readable storage media of claim 14, wherein in causing performance of placement actions with respect to the different data, the program instructions cause the one or more computing devices to implement removing at least a portion of data at one of the plurality of multi-tenant cache nodes as one of the placement actions.

17. The one or more non-transitory, computer-readable storage media of claim 14, wherein the usage of the plurality of multi-tenant cache nodes is recorded as a time series, and wherein, in applying the usage prediction technique to the usage of the plurality of multi-tenant cache nodes to make respective placement decisions, the program instructions cause the one or more computing devices to implement:

evaluating the time series to build a time series prediction model for future usage of the plurality of multi-tenant cache nodes;

using the time series prediction model to make a usage prediction for the plurality of multi-tenant cache nodes; and scheduling placement of the different data at different ones of the plurality of multi-tenant cache nodes according to the usage prediction.

18. The one or more non-transitory, computer-readable storage media of claim 17, storing further instructions that when executed on or across the one or more computing devices, causes the one or more computing devices to implement:

after recording further usage of the plurality of multi-tenant cache nodes for the performance of additional access requests, updating the time series prediction model based on the further usage of plurality of multi-tenant cache nodes.

19. The one or more non-transitory, computer-readable storage media of claim 18, wherein updating the time series prediction model is performed responsive to exceeding a period of time since a last update of the time series prediction model.

20. The one or more non-transitory, computer-readable storage media of claim 14, wherein, in applying the usage prediction technique to the usage of the plurality of multi-tenant cache nodes to make respective placement decisions, the program instructions cause the one or more computing devices to implement:

training a reinforcement learning agent to make placement decisions based on the usage of the plurality of multi-tenant cache nodes; and using the reinforcement learning agent to determine the respective placement decisions.

* * * * *